United States Patent [19]
Wasserman et al.

[11] Patent Number: 5,998,558
[45] Date of Patent: Dec. 7, 1999

[54] ETHYLENE POLYMERS HAVING ENHANCED PROCESSING EASE

[75] Inventors: Scott Hanley Wasserman, Bridgewater; George Norris Foster, Bloomsbury; James LaMonte Adams, Somerset; Robert Harold Vogel, Ringoes, all of N.J.

[73] Assignee: Union Carbide Chemicals & Plastics Technology Corporation, Danbury, Conn.

[21] Appl. No.: 08/999,267

[22] Filed: Dec. 29, 1997

[51] Int. Cl.$^6$ .................................................. C08F 210/16
[52] U.S. Cl. ..................................... 526/348.6; 526/348.1; 526/348.2; 526/348.4; 526/348.5; 526/160; 526/943
[58] Field of Search .............................. 526/348.1, 348.2, 526/348.4, 348.5, 348.6, 160, 943

[56] References Cited

U.S. PATENT DOCUMENTS

| | | | |
|---|---|---|---|
| 5,272,236 | 12/1993 | Lai et al. | 526/348.5 |
| 5,278,272 | 1/1994 | Lai et al. | 526/348.5 |
| 5,324,800 | 6/1994 | Welborn, Jr. et al. | 526/160 |
| 5,420,220 | 5/1995 | Cheruvu et al. | 526/348.1 |
| 5,527,752 | 6/1996 | Reichle et al. | 502/117 |

FOREIGN PATENT DOCUMENTS

WO9407930 of 0000 WIPO.

*Primary Examiner*—David W. Wu
*Assistant Examiner*—Ling-siu Choi
*Attorney, Agent, or Firm*—Sharon Hegedus

[57] ABSTRACT

An ethylene polymer having
a) a Polydispersity Index, PDI, of about 3 to 9;
b) an nRSI of about 5 to about 18;
c) a cRSI of about 1.1 to 3.0;
d) a Composition Distribution Index, CDI(100), greater than about 45; and
e) a log-viscosity ratio, $\log(\eta 0/[\eta])$, of about 0.5 to about 1.5 is described. The ethylene polymer has improved processability over conventional linear low density polyethylene.

18 Claims, No Drawings

ETHYLENE POLYMERS HAVING ENHANCED PROCESSING EASE

This invention relates to ethylene polymers having improved processing ease relative to conventional linear low density polyethylene and approaching that of high pressure polyethylene but with toughness superior to high pressure polyethylene. The enhanced rheological properties of these resins make them ideal for use in applications requiring enhanced extrudability and melt strength.

BACKGROUND OF THE INVENTION

Wide attention has been given to metallocene catalysts for their ability to make ethylene polymers having relatively narrow molecular weight and comonomer distributions at excellent polymerization rates. Such narrow molecular weight and comonomer distributions contribute to improvements in clarity, toughness, and extractables levels in ethylene polymers having densities much below 0.95 g/cc. However, for some applications requiring processing ease, such as enhanced extrudability, these ethylene polymers can be deficient due to their narrow molecular weight distributions. For example, U.S. Pat. Nos. 5,420,220 and 5,324,800 disclose metallocene-made, linear low-density polyethylenes having characteristic narrow molecular weight and comonomer distributions, along with the associated limitations in processability.

Unfortunately, if the molecular weight distribution of an ethylene polymer is broadened in order to improve processability, the clarity and impact strength of the polymer diminish. In addition, extractables increase, especially for ethylene polymers having densities much below 0.93 g/cc. To improve the processability of an ethylene polymer while maintaining a narrow molecular weight distribution, long chain branching may be incorporated into the polymer. For instance, U.S. Pat. Nos. 5,272,236 and 5,278,272 and PCT Application No. WO94/07930 describe metallocene-made, very low-density and low-density polyethylene having long chain branch structures that are reported to have improved processability. However, long chain branch structures sometimes promote directional orientation during fabrication leading to an imbalance in mechanical properties and reduced impact and tear resistance. The clarity of fabricated articles such as blown film may also be less than optimum for long chain branched ethylene polymers even with narrow molecular weight and comonomer distributions. It would be advantageous, therefore to identify ethylene polymers having the benefit of long chain branching that maintain good mechanical strength and clarity.

U.S. application Ser. No. 08/611,278 filed on Mar. 3, 1996, now abandoned discloses ethylene polymers having narrow molecular weight and comonomer distributions, and very high clarity. However, these polymers do not possess a high degree of fabrication ease, i.e., extrudability, bubble stability in blown film processing, and melt instability resistance in cast film processing. This is due to their relatively low normalized Relaxation Spectrum Index (nRSI), which ranges from about 2.5 to about 6.5. U.S. Pat. No. 5,527,752 generically discloses catalyst compositions that are complexes of transition metals, substituted or unsubstituted π-bonded ligands, and heteroallyl moieties, which may be used to make these ethylene polymers.

An ethylene polymer having fabrication ease superior to that of the ethylene polymer disclosed in U.S. application Ser. No. 08/611,278 filed on Mar. 19, 1996, now abandoned and yet maintaining good mechanical strength and clarity, has now been discovered. This ethylene polymer has a broadened relaxation time distribution that is defined by its high nRSI and cRSI.

SUMMARY OF THE INVENTION

The invention provides an ethylene polymer having
a) a Polydispersity Index, PDI, of about 3 to 9;
b) an nRSI of about 5 to about 18;
c) a cRSI of about 1.1 to 3.0;
d) a Composition Distribution Index, CDI(100), greater than about 45; and
e) a log-viscosity ratio, $\log(\eta 0/[\eta])$, of about 0.5 to about 1.5.

The invention also provides film, extrusion coating, molded articles, and the like made from the above ethylene polymer.

DETAILED DESCRIPTION OF THE INVENTION

Ethylene polymers of the invention include ethylene homopolymers, and interpolymers of ethylene and linear or branched higher alpha-olefins containing 3 to about 20 carbon atoms, with densities ranging from about 0.90 to about 0.95 and melt indices of about 0.1 to 200. Suitable higher alpha-olefins include, for example, propylene, 1-butene, 1-pentene, 1-hexene, 4-methyl-1-pentene, 1-octene, and 3, 5, 5-trimethyl 1-hexene. Cyclic olefins such as vinyl cyclohexane or norbornene may also be polymerized with the ethylene. Aromatic compounds having vinyl unsaturation, such as styrene and substituted styrenes, may also be included as comonomers. Particularly preferred ethylene polymers comprise ethylene and about 1 to about 40 percent by weight of one or more comonomers described above.

The present ethylene polymer has a Polydispersity Index uncorrected for long chain branching of about 3 to about 9, preferably about 3 to about 7, more preferably above about 4 to about 7. The Polydispersity Index (PDI) of a polymer is defined as the ratio of the weight average molecular weight of the polymer to the number average molecular weight of the polymer ($M_w/M_n$). PDI, uncorrected for long chain branching, is determined using size exclusion chromatography (SEC) with a WATERS 150C GPC instrument operating at 140° C. with 1,2,4-trichlorobenzene at a flow rate of 1 ml/min. The pore size range of the column set provides for a MW separation covering the 200 to 10,000,000 Daltons range. National Institute of Standards Technology polyethylene standard NBS 1475 is used as the calibration standard to obtain the uncorrected (linear polymer assumed) molecular weight distribution.

The present ethylene polymer has excellent processability, especially relative to known metallocene-made polymers. The ethylene polymer has a relatively high normalized Relaxation Spectrum Index, nRSI, namely about 5 to about 24. Preferably, the nRSI of the ethylene polymer is above 6.5 to about 18. In addition, the ethylene polymer has a corrected Relaxation Spectrum Index, cRSI, of about 1.1 to about 3.0, preferably about 1.2 to about 2.5.

The nRSI of a polymer is defined as $(RSI)(MI^{0.6})$, wherein MI is the melt index of the polymer reported as grams per 10 minutes, determined in accordance with ASTM D-1238, condition E, at 190° C., and RSI is the Relaxation Spectrum Index of the polymer in dimensionless units. cRSI is defined as $(RSI)(MI^{0.6})(PDI^{-1.2})$, wherein RSI, MI and PDI are defined above.

The RSI of the ethylene polymer is determined by first subjecting the polymer to a shear deformation and measuring its response to the deformation using a rheometer. As is known in the art, based on the response of the polymer and the mechanics and geometry of the rheometer used, the relaxation modulus G(t) or the dynamic moduli G'(ω) and G"(ω) may be determined as functions of time t or frequency ω, respectively (see J. M. Dealy and K. F. Wissbrun, *Melt Rheology and Its Role in Plastics Processing*, Van Nostrand Reinhold, 1990, pp. 269–297). The mathematical connection between the dynamic and storage moduli is a Fourier transform integral relation, but one set of data may also be calculated from the other using the well known relaxation spectrum (see S. H. Wasserman, *J. Rheology*, Vol. 39, pp. 601–625 (1995)). Using a classical mechanical model, a discrete relaxation spectrum consisting of a series of relaxations or "modes," each with a characteristic intensity or "weight" and relaxation time, may be defined. Using such a spectrum, the moduli are re-expressed as:

$$G'(\omega) = \sum_{i=1}^{N} g_i \frac{(\omega \lambda_i)^2}{1+(\omega \lambda_i)^2}$$

$$G''(\omega) = \sum_{i=1}^{N} g_i \frac{\omega \lambda_i}{1+(\omega \lambda_i)^2}$$

$$G(t) = \sum_{i=1}^{N} g_i \exp(-t/\lambda_i)$$

where N is the number of modes and $g_i$ and $\lambda_i$ are the weight and time for each of the modes (see J. D. Ferry, *Viscoelastic Properties of Polymers*, John Wiley & Sons, 1980, pp. 224–263). A relaxation spectrum may be defined for the polymer using software such as IRIS® rheological software, which is commercially available from IRIS Development. Once the distribution of modes in the relaxation spectrum is calculated, the first and second moments of the distribution, which are analogous to $M_n$ and $M_w$, the first and second moments of the molecular weight distribution, are calculated as follows:

$$g_I = \sum_{i=1}^{N} g_i \Big/ \sum_{i=1}^{N} g_i/\lambda_i$$

$$g_{II} = \sum_{i=1}^{N} g_i \lambda_i \Big/ \sum_{i=1}^{N} g_i$$

RSI is defined as $g_{II}/g_I$.

Because RSI is sensitive to such parameters as a polymer's molecular weight distribution, molecular weight, and long chain branching, it is a sensitive and reliable indicator of the stress relaxation of a polymer. The higher the value of nRSI or cRSI, the broader the relaxation time distribution of the polymer, and therefore the better the processability of the polymer.

The ethylene polymers also have a Composition Distribution Index, CDI(100), greater than about 45. Preferably, the CDI(100) of the ethylene polymer is greater than about 50, more preferably greater than about 65. Polymers having a CDI(100) greater than about 50 are considered to be fairly homogeneous in comonomer distribution. The CDI(100) is defined as the weight percent of the copolymer chains having a branching frequency within 100% (±50%) of the mean branching frequency, as determined by Temperature Rising Elution Fractionation (TREF). The mean branch frequency is calculated by:

$$\overline{BF} = \sum_{i=1}^{\infty} w_i b_i$$

were $w_i$ is the weight fraction and $b_i$ is the branch frequency at each slice i of the TREF chromatogram. CDI(100) is then calculated by determining the accumulative weight fraction contained within ±50% of $\overline{BF}$.

The present ethylene polymer also has a log-viscosity ratio, log(η0/[η]), of about 0.5 to about 1.5, preferably about 0.6 to about 1.3. The log-viscosity ratio of the polymer is the logarithm of the ratio of its zero shear viscosity to its intrinsic viscosity. The intrinsic viscosity ([η]) is a measure of the size of polymer molecules in dilute solution. In dilute solution, individual polymer chains are isolated from others in the polymer, so intermolecular entanglements are not relevant. The zero-shear viscosity (η0) is a measure of the long-time scale relaxation behavior of the polymer in the melt state. As such, the zero-shear viscosity (η0) is sensitive to molecular structure such as molecular weight, molecular weight distribution, and long-chain branching to the extent that those structures effect the entanglements with other molecules in the melt state of the polymer. The log-viscosity ratio, log(η0/[η]), therefore is an indication of the entanglement behavior of polymer molecules of a given size in dilute solution.

For purposes of the present invention, the intrinsic viscosity ([η]) values are calculated from the SEC data (uncorrected for long chain branching) and represent [η] at 140° C. in 1,2,4-trichlorobenzene. [η] is calculated by the following formula:

$$[\eta] = \sum KM_i^A W_i$$

where $M_i$ and $W_i$ are the molecular weight and weight fraction, respectively, of each "slice" i of the SEC chromatogram, and K and A are the Mark-Houwink constants for polyethylene. Values for K and A are $40.6 \times 10^{-5}$ and 0.725, respectively, as reported by T. G. Scholte, et. al., J. Appl. Polym. Sci., 29, 3763 (1984). (It should be noted that [η] values can also be measured from dilute solution at 140° C. in 1,2,4-trichlorobenzene, which is the preferred method for determining [η] for HP-LDPE due to its particular molecular structure.) In this invention, [η] has units of $cm^3/mg$.

For purposes of the present invention, the zero-shear viscosity (η0) is calculated from the discrete relaxation spectrum that is obtained from rheological measurements as described above. η0 is calculated by the following formula:

$$\eta 0 = \sum_{i=1}^{N} g_i \lambda_i$$

where N, $g_i$, $\lambda_i$ are defined as above (see J. D. Ferry, *Viscoelastic Properties of Polymers*, John Wiley & Sons, 1980, pp. 59–70). (Alternatively, values for η0 can be measured directly from creep-recovery rheological experiments in which a steady stress (1000 Pa) is applied for a fixed period of time (3 min.), after which the stress becomes zero (see J. D. Ferry, *Viscoelastic Properties of Polymers*, John Wiley & Sons, 1980, pp. 17–20).) In this invention, η0 has units of kPa.s.

The ethylene polymer of the invention may be made in a variety of ways. In one embodiment of the invention, the ethylene polymer is made by polymerizing ethylene and optionally another monomer in the presence of a catalyst composition comprising methylcyclopentadienyl zirconium tris(pivalate):

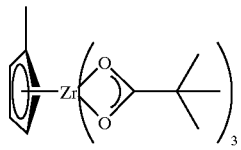

and an activating cocatalyst.

In another embodiment of the invention, the ethylene polymer is made by polymerizing ethylene and optionally another monomer in the presence of a catalyst composition comprising the reaction product of a) a fulvene of the formula:

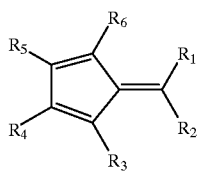

including oligomers thereof, wherein each $R_1$, $R_2$, $R_3$, $R_4$, $R_5$, and $R_6$ is independently hydrogen, hydrocarbyl, or a heteroatom-containing group; and any two or more R groups may be joined to form a ring;

b) a complex of the formula $[L_m MX_n]_r$ wherein each L is a neutral ligand, M is an atom selected from Groups 3 to 14 and the Lanthanides, each X is an anionic group, m is an integer of 0 or greater, n is an integer of 0 or greater; and r is an integer of 1 or greater; and c) an activating cocatalyst.

Suitable activating cocatalysts are known in the art and include for example aluminoxanes, i.e., methylaluminoxane (MAO) and modified methylaluminoxane (MMAO), and boron alkyls. Aluminoxanes are preferred cocatalysts for use with catalysts of formulas I and II above, and their method of preparation and use is well known in the art.

The catalyst composition can be supported or in unsupported, liquid form such as a solution or dispersion, or spray dried. In the case of a supported catalyst composition, typical supports include, for example, silica, carbon black, polyethylene, polycarbonate, porous crosslinked polystyrene, porous crosslinked polypropylene, alumina, thoria, zirconia, and magnesium halide (e.g., magnesium dichloride) as well as other well known support materials and mixtures thereof.

Particularly preferred however is a catalyst composition that is spray dried or in unsupported, liquid form. For example, the catalyst composition may be introduced into the reaction zone in unsupported, liquid form as described in U.S. Pat. No. 5,317,036. As used herein, "unsupported, liquid form" includes liquid catalyst precursor, liquid cocatalyst, solution(s) or dispersions thereof in the same or different solvent(s), and combinations thereof Unsupported, liquid form catalyst compositions have a number of practical benefits. Unsupported catalyst compositions avoid the costs associated with support material and its preparation, and provide for the realization of a very high catalyst surface area to volume ratio. Furthermore, unsupported catalyst compositions produce polymers having a much lower residual ash content than polymers produced using supported catalyst compositions.

The ethylene polymers may be made by any conventional suspension, solution, slurry or gas phase polymerization process, using reaction conditions well known in the art. One reactor or several reactors in series may be employed. Gas phase polymerization is preferred using one or more fluidized bed reactors.

Polymerization is preferably conducted in the gas phase in a stirred or fluidized bed reactor, using equipment and procedures well known in the art. Preferably, superatmospheric pressures in the range of 1 to 1000 psi, preferably 50 to 400 psi, and most preferably 100 to 300 psi, and temperatures in the range of 30 to 130° C., preferably 65 to 110° C. are used. Ethylene and other monomers, if used, are contacted with an effective amount of catalyst composition at a temperature and a pressure sufficient to initiate polymerization.

Suitable gas phase polymerization reaction systems comprise a reactor to which monomer(s) and catalyst composition may be added, and that contain a bed of forming polyethylene particles. The invention is not limited to any specific type of gas phase reaction system. As an example, a conventional fluidized bed process is conducted by passing a gaseous stream containing one or more monomers continuously through a fluidized bed reactor under reaction conditions and in the presence of catalyst composition at a velocity sufficient to maintain the bed of solid particles in a suspended condition. The gaseous stream containing unreacted gaseous monomer is withdrawn from the reactor continuously, compressed, cooled, optionally partially or fully condensed, and recycled into the reactor. Product is withdrawn from the reactor and make-up monomer is added to the recycle stream.

Conventional additives may be included in the process, provided they do not interfere with the functioning of the catalyst composition.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

Organometallic compounds may be employed as scavenging agents for poisons to increase the catalyst activity. Examples of these compounds are metal alkyls, preferably aluminum alkyls, most preferably trisobutyl-aluminum tri-n-hexyl aluminum. Use of such scavenging agents is well known in the art.

The ethylene polymers may be blended with other polymers and resins as desired using techniques known in the art. In addition, various additives and reagents may be mixed with the ethylene polymers. Specifically, additional thermo- and photo-oxidation stabilizers including hindered phenolic and hydroxy amino antioxidants, hindered amine light stabilizers, thioesters, or disulfide and aryl phosphites or phosphonites can be added. To meet specialized product requirements crosslinkers including dicumyl peroxide, colorants including carbon blacks and titanium dioxide, lubricants including metallic stearates, processing aids including fluoroelastomers, slip agents including oleamide or erucamide, antiblock or release agents including stearamide, ethylene bis-stearamide, controlled particle size zeolite, calcium carbonate, talc, or silica, blowing agents, flame retardants and other conventional materials may be mixed with the ethylene polymer of the invention as desired.

The ethylene polymers of the invention are useful for fabrication into a variety of finished articles such as blown and cast films including clarity and shrink applications, extrusion coatings, wire and cable insulation and jacketing, crosslinked power cable insulation, molded articles made by injection molding, blow molding, or rotational molding, extrusions of pipe, tubing, profiles and sheeting, and insulating and semiconductive jacketing and/or shields. Methods of making such articles are well known in the art.

The disclosures of the patents referred to above are incorporated herein by reference.

The following non-limiting examples further illustrate the invention.

EXAMPLES

Measurements

Molecular Weights and Molecular Weight Distribution were determined as follows. A WATERS 150C GPC chromatograph equipped with mixed-pore size columns for molecular weight measurements was employed. For the size exclusion chromatography (SEC), a 25 cm long preliminary column from Polymer Labs having a 50 Å nominal pore size, followed by three 25 cm long Shodex A-80 M/S (Showa) columns to affect a molecular weight separation for linear ethylene polymer from about 200 to 10,000,000 Daltons were used. Both columns contained porous poly (styrene-divinyl benzene) packing. 1,2,4,-trichlorobenzene was used as the solvent to prepare the polymer solutions and the chromatographic eluent. All measurements were made at a temperature of 140±0.2° C. The analog signals from the mass and viscosity detectors were collected into a computer system. The collected data were then processed using standard software commercially available from several sources (Waters Corporation and Viscotek Corporation) for molecular weight distribution uncorrected for long chain branching. The calibration used the broad MWD calibrant method and a linear polymer as the calibrant. (See W. W. Yau, J. J. Kirkland and D. D. Bly, *Modern Size-Exclusion Liquid Chromatography*, Wiley, 1979, p. 289–313.) For the latter, two MW related statistics such as number and weight average MW values must be known for the polymer calibrant. Based on the MW calibration, elution volume is converted to molecular weight for the assumed linear ethylene polymer.

CDI 100 measurements were determined from Temperature Rising Elution Fractionation (TREF), as described in Wild et al., *J. Polymer Sci., Poly. Phys. Ed.*, Vol. 20, p. 441 (1982). A dilute solution of the ethylene polymer in a solvent such as 1,2,4-trichlorobenzene, at 1–4 mg/ml, is loaded at high temperature onto a packed column. The column is then allowed to slowly cool down at 0.1° C./min. to ambient temperature in a controlled manner so that the ethylene polymer is crystallized onto the packing in the order of increasing branching (or decreasing crystallinity) with the decreasing temperature. The column is then heated in a controlled manner at 0.7° C./min to above 140° C. with a constant solvent flow at 2 ml/min through the column. The polymer fractions as they are eluted have decreasing branching (or increasing crystallinity) with the increasing temperature. An infrared concentration detector is used to monitor effluent concentrations as a function of elution temperature. The TREF elution temperature can be directly related to branch frequency for a given comonomer.

Direct IV measurements were made on a model PVS automated dilution viscometer from Lauda, utilizing an Ubbelohde dilution capillary tubes, and PVS1 software. Measurements were made at 140° C. in 1,2,4-trichlorobenzene.

Dynamic oscillatory shear rheological measurements were done via experiments conducted with a new model of the Weissenberg Rheogoniometer commercially available from TA Instruments. Experiments were run in parallel plate mode under a nitrogen atmosphere at 190° C. Sample sizes ranged from approximately 1100 to 1500 $\mu$m and were 4 cm in diameter. The frequency sweep experiments covered a frequency range of 0.1 to 100 sec$^{-1}$ with a 2% strain amplitude. The torque response was converted by the TA Instruments rheometer control software to dynamic moduli and dynamic viscosity data at each frequency. Discrete relaxation spectra were fit to the dynamic moduli data for each sample using the IRIS® commercial software package.

The melt index of the polymers reported as grams per 10 minutes, was determined in accordance with ASTM D1238, condition E.

Examples 1–14 and Comparative Examples 1–19

A series of ethylene/1-hexene copolymers according to the invention (Examples 1–14) were compared with samples of known polyethylene for a variety of properties. The results are shown in Table 1. Table 2 shows that the ethylene polymers of this invention are uniquely described and separated from the Comparative Examples by their combination of PDI, nRSI, cRSI, CDI(100), and log-viscosity ratio.

The ethylene polymers in Examples 1–7 were made using a 14 inch nominal diameter, gas phase, fluidized bed reactor having a bed height of 10 feet. Each of the catalyst compositions employed in Examples 1–7 were in unsupported, liquid form and comprised comprising methylcyclopentadienyl zirconium tris(pivalate) catalyst and modified methylaluminoxane activating cocatalyst.

The ethylene polymers in Examples 8–12 were made in a commercial scale, gas phase fluidized bed reactor. Each of the catalyst compositions employed in Examples 8–12 were in unsupported, liquid form and comprised comprising methylcyclopentadienyl zirconium tris(pivalate) catalyst and modified methylaluminoxane activating cocatalyst.

The ethylene polymers in Examples 13 and 14 were made using a 14 inch nominal diameter, gas phase, fluidized bed reactor having a bed height of 10 feet. The catalyst compositions employed in Examples 13 and 14 comprised a solution of cyclohexanofulvene and $Zr(NEt_2)_4$ (2:1 mole ratio) mixed with modified methylaluminoxane.

Comparative Example 1 was a low-density polyethylene made by a gas phase, fluidized bed reaction in a staged reactor configuration using a Ziegler-Natta catalyst.

Comparative Example 2 was a sample of AFFINITY FM-1570 polyethylene, commercially available from The Dow Chemical Company.

Comparative Example 3 was a sample of EXCEED 350L65 polyethylene, commercially available from Exxon Chemical Company.

Comparative Example 4 was a commercial, linear low density copolymer of ethylene and 1-hexene made with a chrome catalyst by the UNIPOL process (Union Carbide Corp.) using a gas phase, fluidized bed reactor.

Comparative Examples 5–7 were polyethylenes made by high-pressure, free radical polymerization. These low density polyethylenes were produced in a high-pressure, tubular reactor using multiple organic initiators, pressures up to 3000 atmosphere and temperatures up to 320° C. The process used to produce these high-pressure, low density polyethylenes was similar to that described in Zabisky et al., *Polymer*, 33, No. 11, 2243, 1992.

Comparative Examples 8–10 were commercial, linear low-density polyethylenes made by the UNIPOL process (Union Carbide Corp.) using a gas phase, fluidized bed reactor. They were ethylene copolymers of 1-butene or 1-hexene, and are commercially available from Union Carbide Corp. under the product designations DFDA-7047, HS-7028, and HS-7093.

Comparative Examples 11 and 12 were samples of EVOLUE SP-2020 and SP-2520 polyethylene, both commercially available from Mitsui Petrochemical Co.

Comparative Examples 13–15 were ethylene/1-butene copolymers produced according to Example 1 of U.S. Pat. No. 5,374,700.

Comparative Examples 16–18 were copolymers of ethylene and 1-hexene according to U.S. patent application Ser. No. 08/611,278 filed on Mar. 19, 1996, now abandoned.

Comparative Example 19 was a copolymer of ethylene and 1-hexene according to U.S. patent application Ser. No. 08/728,848 filed on Oct. 10, 1996, now U.S. Pat. No. 5,798,427.

The ethylene polymers of the invention were each dry blended with about 1500 ppm IRGANOX B-900 (Ciba-Geigy Corporation) and compounded in a 1 ½ inch Killion Extruder with a standard LLDPE mixing screw (30/1 length to diameter) at a rate of 40 lb/hr (~98 rpm).

| Example | I PDI | II CDI(100) | III nRSI | IV cRSI | VIII log($\eta_0$/[$\eta$]) | all |
|---|---|---|---|---|---|---|
| Example 1 | + | + | + | + | + | + |
| Example 2 | + | + | + | + | + | + |
| Example 3 | + | + | + | + | + | + |
| Example 4 | + | + | + | + | + | + |
| Example 5 | + | + | + | + | + | + |
| Example 6 | + | + | + | + | + | + |
| Example 7 | + | + | + | + | + | + |
| Example 8 | + | + | + | + | + | + |
| Example 9 | + | + | + | + | + | + |
| Example 10 | + | + | + | + | + | + |
| Example 11 | + | + | + | + | + | + |
| Example 12 | + | + | + | + | + | + |
| Example 13 | + | + | + | + | + | + |
| Example 14 | + | + | + | + | + | + |
| Comp. Ex. 1 | − |   | + | − | + | − |
| Comp. Ex. 2 | − |   | + | + | + | + |
| Comp. Ex. 3 | − | + | − | − | − | − |
| Comp. Ex. 4 | − |   | + | + | − | + |
| Comp. Ex. 5 | + |   | − | − | − | − |
| Comp. Ex. 6 | + | + | − | − | + | − |
| Comp. Ex. 7 | + |   | − | + | + | − |
| Comp. Ex. 8 | + |   | − | − | + | − |
| Comp. Ex. 9 | + | − | − | − | + | − |
| Comp. Ex. 10 | + | − | − | − | + | − |

| Example | MI g/10 min | PDI | CDI(100) | RSI | nRSI | cRSI | $\eta_0$ kPa·s | [$\eta$] cm3/mg | log($\eta_0$/[$\eta$]) |
|---|---|---|---|---|---|---|---|---|---|
| Example 1 | 0.7 | 3.2 | 76.4 | 9.8 | 7.8 | 1.7 | 15.6 | 1.6 | 0.99 |
| Example 2 | 1.0 | 3.2 | 81.3 | 8.3 | 8.1 | 2.0 | 13.6 | 1.5 | 0.96 |
| Example 3 | 0.9 | 3.6 | 75.4 | 9.8 | 7.8 | 1.7 | 17.0 | 1.5 | 1.05 |
| Example 4 | 1.6 | 3.1 | 82.3 | 5.4 | 6.7 | 1.7 | 7.6 | 1.3 | 0.77 |
| Example 5 | 1.2 | 3.2 | 80.2 | 6.2 | 6.1 | 1.5 | 10.1 | 1.4 | 0.86 |
| Example 6 | 0.7 | 3.1 | 85.3 | 8.4 | 6.1 | 1.6 | 18.3 | 1.5 | 1.09 |
| Example 7 | 1.2 | 3.0 | 85.8 | 7.1 | 7.3 | 2.0 | 10.9 | 1.4 | 0.89 |
| Example 8 | 0.9 | 5.3 | 68.9 | 18.7 | 17.0 | 2.3 | 27.8 | 1.7 | 1.21 |
| Example 9 | 0.8 | 5.0 | 71.2 | 18.1 | 16.0 | 2.3 | 26.8 | 1.6 | 1.22 |
| Example 10 | 1.0 | 5.0 | 72.9 | 17.7 | 17.7 | 2.6 | 22.3 | 1.6 | 1.14 |
| Example 11 | 2.4 | 3.9 | 77.6 | 7.1 | 12.1 | 2.3 | 6.2 | 1.3 | 0.68 |
| Example 12 | 2.2 | 4.2 | 78.5 | 7.9 | 12.7 | 2.3 | 7.1 | 1.3 | 0.74 |
| Example 13 | 1.0 | 3.4 | 83.4 | 5.4 | 5.2 | 1.2 | 10.5 | 1.4 | 0.88 |
| Example 14 | 1.3 | 3.2 | 81.3 | 5.5 | 5.8 | 1.4 | 11.6 | 1.4 | 0.92 |
| Comp. Ex. 1 | 0.1 | 24.6 |  | 51.0 | 10.9 | 0.2 | 170.0 | 2.7 | 1.80 |
| Comp. Ex. 2 | 1.0 | 2.3 |  | 7.4 | 7.4 | 2.7 | 11.4 | 1.2 | 0.98 |
| Comp. Ex. 3 | 1.1 | 2.5 | 74.5 | 2.0 | 2.2 | 0.7 | 5.2 | 1.7 | 0.48 |
| Comp. Ex. 4 | 0.7 | 9.5 |  | 22.0 | 17.7 | 1.1 | 23.3 | 1.5 | 1.19 |
| Comp. Ex. 5 | 0.3 | 5.4 |  | 61.3 | 26.3 | 3.5 | 68.4 | 1.1* | 1.79 |
| Comp. Ex. 6 | 1.9 | 4.4 | 88.0 | 13.3 | 19.7 | 3.4 | 8.8 |  |  |
| Comp. Ex. 7 | 1.8 | 7.1 |  | 17.0 | 24.3 | 2.3 | 8.0 | 0.9* | 0.95 |
| Comp. Ex. 8 | 1.0 | 3.7 |  | 3.3 | 3.3 | 0.7 | 7.6 | 1.6 | 0.68 |
| Comp. Ex. 9 | 1.0 | 4.0 | 33.4 | 4.8 | 4.8 | 0.9 | 8.4 | 1.6 | 0.72 |
| Comp. Ex. 10 | 2.0 | 4.2 | 30.0 | 2.8 | 4.3 | 0.8 | 4.5 | 1.4 | 0.51 |
| Comp. Ex. 11 | 1.5 | 3.7 | 74.6 | 3.7 | 4.8 | 1.1 | 5.2 | 1.4 | 0.57 |
| Comp. Ex. 12 | 1.8 | 3.4 | 52.4 | 3.9 | 5.6 | 1.3 | 4.8 | 1.4 | 0.53 |
| Comp. Ex. 13 | 10.9 | 3.2 |  | 3.5 | 15.1 | 3.7 | 1.0 | 0.9 | 0.04 |
| Comp. Ex. 14 | 13.1 | 3.1 |  | 2.9 | 13.8 | 3.5 | 0.7 | 0.9 | −0.10 |
| Comp. Ex. 15 | 11.9 | 3.1 |  | 3.1 | 14.2 | 3.6 | 0.8 | 0.9 | −0.07 |
| Comp. Ex. 16 | 0.9 | 3.0 | 48.8 | 4.2 | 4.0 | 1.1 | 8.4 | 1.5 | 0.75 |
| Comp. Ex. 17 | 1.8 | 3.1 | 54.7 | 2.4 | 3.5 | 0.9 | 4.4 | 1.4 | 0.49 |
| Comp. Ex. 18 | 1.5 | 2.7 | 57.3 | 2.2 | 2.8 | 0.8 | 5.6 | 1.6 | 0.54 |
| Comp. Ex. 19 | 0.9 | 4.6 |  | 36.9 | 34.6 | 5.6 | 25.4 | 1.3 | 1.29 |

*values measured by solution viscometry method

-continued

| Example | I PDI | II CDI(100) | III nRSI | IV cRSI | VIII log(η0/[η]) | all |
|---|---|---|---|---|---|---|
| Comp. Ex. 11 | + | + | − | − | + | − |
| Comp. Ex. 12 | + | − | + | + | + | − |
| Comp. Ex. 13 | + | − | + | − | − | − |
| Comp. Ex. 14 | + | − | + | − | − | − |
| Comp. Ex. 15 | + | − | + | − | − | − |
| Comp. Ex. 16 | + | − | − | − | + | − |
| Comp. Ex. 17 | + | − | − | − | − | − |
| Comp. Ex. 18 | − | − | − | − | + | − |
| Comp. Ex. 19 | + | − | − | − | + | − |

We claim:

1. An ethylene polymer having:
   a) a Polydispersity Index, PDI, of about 3 to 9;
   b) an nRSI of about 5 to about 18;
   c) a cRSI of about 1.1 to 3.0;
   d) a Composition Distribution Index, CDI(100), greater than about 45; and
   e) a log-viscosity ratio, $\log(\eta 0/[\eta])$, of about 0.5 to about 1.5.

2. The ethylene polymer of claim 1, wherein the PDI is above 4 to about 6.

3. The ethylene polymer of claim 1, wherein the nRSI is above 6.5 to about 18.

4. The ethylene polymer of claim 1, wherein the cRSI is about 1.2 to about 2.5.

5. The ethylene polymer of claim 1, wherein CDI(100) is greater than about 50.

6. The ethylene polymer of claim 1, wherein the log-viscosity ratio, $\log(\eta 0/[\eta])$, is about 0.6 to about 1.3.

7. The ethylene polymer of claim 1 containing about 1 to about 40 percent by weight of a linear or branched alpha-olefin having from 3 to about 20 carbon atoms.

8. The ethylene polymer of claim 1 containing about 1 to about 40 percent by weight of a comonomer selected from the group consisting of propylene, 1-butene, 1-hexene, 4-methyl-1-pentene, 1-octene and mixtures thereof.

9. Film comprising the ethylene polymer of claim 1.

10. An extrusion coated layer comprising the ethylene polymer of claim 1 on substrate.

11. Wire and cable insulation comprising the ethylene polymer of claim 1.

12. Wire and cable jacketing comprising the ethylene polymer of claim 1.

13. Crosslinked, power cable insulation comprising the ethylene polymer of claim 1.

14. A molded article comprising the ethylene polymer of claim 1.

15. Insulating jackets comprising the ethylene polymer of claim 1.

16. Semi-conductive jackets comprising the ethylene polymer of claim 1.

17. Insulating shields comprising the ethylene polymer of claim 1.

18. Semi-conductive shields comprising the ethylene polymer of claim 1.

* * * * *